US007480649B2

(12) United States Patent
Fuh et al.

(10) Patent No.: US 7,480,649 B2
(45) Date of Patent: Jan. 20, 2009

(54) METHOD FOR EFFICIENT EVALUATION OF INDEX SCREENING PREDICATES

(75) Inventors: You-Chin Fuh, San Jose, CA (US); Ping Wang, San Jose, CA (US); Li Xia, San Jose, CA (US); Binghua Zhen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/176,601

(22) Filed: Jul. 6, 2005

(65) Prior Publication Data

US 2007/0011143 A1    Jan. 11, 2007

(51) Int. Cl.
*G06F 7/00* (2006.01)
(52) U.S. Cl. .......................................... 707/3; 711/216
(58) Field of Classification Search ........................ 707/3
See application file for complete search history.

(56) References Cited

U.S. PATENT DOCUMENTS

| | | | | | |
|---|---|---|---|---|---|
| 5,590,324 | A | | 12/1996 | Leung et al. ................. | 395/605 |
| 5,647,058 | A | * | 7/1997 | Agrawal et al. ................ | 707/1 |
| 6,009,425 | A | * | 12/1999 | Mohan ........................... | 707/8 |
| 6,081,799 | A | | 6/2000 | Beavin et al. ................. | 704/257 |
| 6,175,835 | B1 | * | 1/2001 | Shadmon ..................... | 707/102 |
| 6,260,037 | B1 | * | 7/2001 | Bestgen et al. .................. | 707/4 |
| 6,439,783 | B1 | * | 8/2002 | Antoshenkov .................. | 707/3 |
| 6,571,233 | B2 | | 5/2003 | Beavin et al. .................... | 707/2 |
| 2003/0212670 | A1 | | 11/2003 | Yalamanchi et al. ........... | 707/3 |
| 2004/0103082 | A1 | | 5/2004 | Tran et al. ....................... | 707/2 |
| 2004/0122804 | A1 | | 6/2004 | Zhang et al. .................... | 707/3 |
| 2004/0133567 | A1 | * | 7/2004 | Witkowski et al. ............. | 707/3 |
| 2005/0033733 | A1 | * | 2/2005 | Shadmon et al. ................ | 707/2 |
| 2005/0050391 | A1 | * | 3/2005 | Grieskamp et al. ............ | 714/25 |
| 2005/0086422 | A1 | * | 4/2005 | Wong et al. .................. | 711/103 |
| 2006/0010337 | A1 | * | 1/2006 | Suzuki .......................... | 714/4 |

OTHER PUBLICATIONS

Gennady Antoshenkov, Dynamic Opitimization of Index Scans Restricted by Booleans, Mar. 1, 1996, pp. 430-440.*
Gennady Antoshenkov, Dynamic Opitimization of Index Scans Restricted by Booleans, Pushished Mar. 1, 1996, Oracle Coporation, pp. 430-440.*

* cited by examiner

*Primary Examiner*—Pierre M. Vital
*Assistant Examiner*—Truong V Vo
(74) *Attorney, Agent, or Firm*—Janaki K. Davda; Konrad Raynes & Victor LLP

(57) ABSTRACT

Techniques are provided for processing a query using an index. It is determined whether a number of consecutive keys that evaluate to a false-positive when applying a screening predicate in the query exceeds a false-positive predefined value. One or more keys in the index are skipped in response to determining that the number of consecutive keys exceeds the false-positive predefined value.

8 Claims, 10 Drawing Sheets

METHOD FOR EFFICIENT EVALUATION OF INDEX SCREENING PREDICATES

BACKGROUND

1. Field

Embodiments of the invention relate to efficient evaluation of index screening predicates.

2. Description of the Related Art

Relational DataBase Management System (RDBMS) software may use a Structured Query Language (SQL) interface. The SQL interface has evolved into a standard language for RDBMS software and has been adopted as such by both the American National Standards Institute (ANSI) and the International Standards Organization (ISO).

A RDBMS uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns.

A table in a database can be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

Indexable predicates may be described as predicates that are applied to index columns (i.e., columns used to build an index). An indexable predicate may be described as either a matching predicate or a screening predicate. Matching predicates may be described as having a constraint on leading index columns and, hence, may be used to define the search range of index scans. Screening predicates, on the other hand, are used to provide additional filtering once a key is looked up in an index scan. For example, let IX1 be an index on columns C1 and C2. In Query (1), the predicate 'C1 BETWEEN 1 AND 95' is a matching predicate, and predicate 'C2 BETWEEN 50 AND 52' is a screening predicate.

| Query (1) |
|---|
| SELECT * FROM T<br>WHERE C1 BETWEEN 1 AND 95<br>AND C2 BETWEEN 50 AND 52; |

An example is provided below to explain the nature of the problem. In the example, table T is a table of transactions in year 2003, and index IX1 is a 2-column index over date and amount for table T. The Query (2) finds all the 'high volume' transactions in the first half of year 2003. Suppose an optimizer of the RDBMS exploits index IX1 for the scan of table T. In this example, the 1-column matching index scan has poor matching selectivity (roughly 50%) and high screening selectivity (assuming 2%).

| Query (2) | |
|---|---|
| SELECT * FROM T | |
| WHERE date BETWEEN '2003-01-01' AND '2003-06-30' | <- 50% selectivity |
| AND amount >= 300000; | <- 2% selectivity |

In this example, table T contains one million records. The index scan for the matching predicate results in a scan of roughly 500,000 keys. For each key found to meet the matching predicate, the screening predicate is applied, which, results in 500,000 evaluations of the screening predicate. However, less than 20,000 keys actually survive the screening predicate in this example.

A B-tree index is a binary tree that may be used to store the references to the records in a table. FIG. 1 illustrates a sample B-tree index 100 that represents the results of Query (2). In the B-tree index 100, the bottom level contains "leaves" or "leaf pages". Each leaf page contains a list of keys. Each leaf page includes a pointer to a next leaf page. For the matching range, there are a large number of false-positives. A false-positive may be described as a key that results in a match for the matching predicate but not for the screening predicate.

Thus, there is a need in the art for efficient evaluation of index screening predicates.

SUMMARY

Provided are a method, article of manufacture, and system for processing a query using an index. It is determined whether a number of consecutive keys that evaluate to a false-positive when applying a screening predicate in the query exceeds a false-positive predefined value. One or more keys in the index are skipped in response to determining that the number of consecutive keys exceeds the false-positive predefined value.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of embodiments of the invention.

Figure 1:
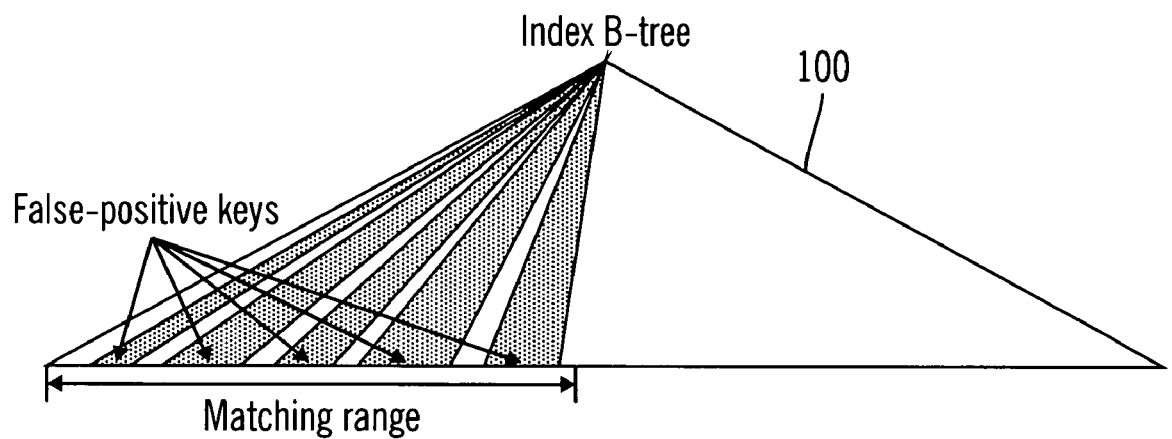
FIG. 1 illustrates a sample B-tree index.
Figure 2:
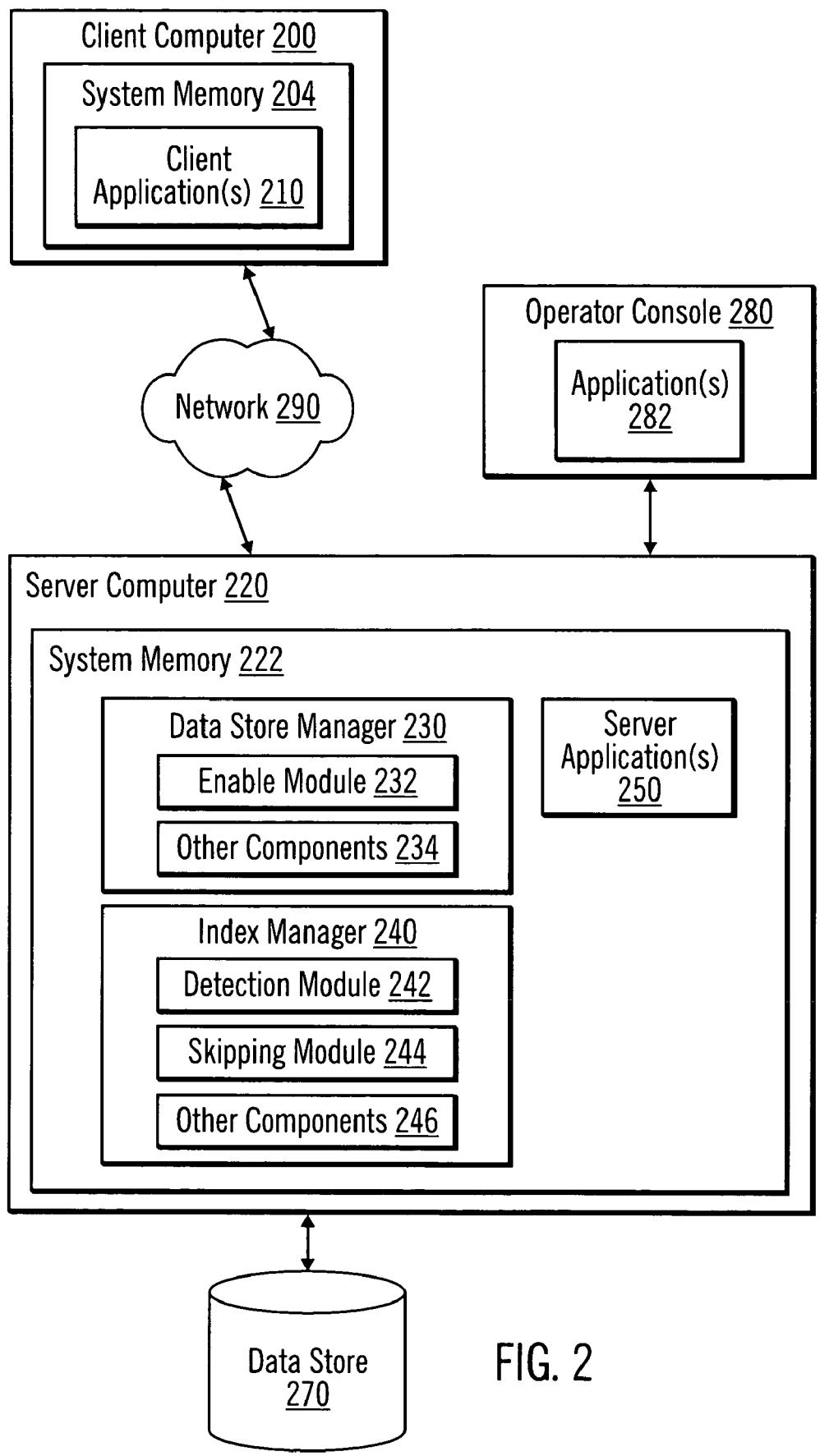
FIG. 2 illustrates details of a computer architecture in which certain embodiments may be implemented.

FIG. 2 illustrates details of a computer architecture in which certain embodiments may be implemented. A client computer 200 is connected via a network 290 to a server computer 220. The client computer 200 includes system memory 204, which may be implemented in volatile and/or non-volatile devices. One or more client applications 210 (i.e., computer programs) are stored in the system memory 204 for execution by a processor (e.g., a Central Processing Unit (CPU)) (not shown).

The server computer 220 includes system memory 222, which may be implemented in volatile and/or non-volatile devices. System memory 222 stores a data store manager 230 (e.g., a Relational DataBase Management System (RDBMS)), an index manager 240, and one or more server applications 250. The data store manager 130 includes an enable module 232 and may include one or more other components 234. The index manager 240 includes a detection module 242 and a skipping module 244. The index manager 240 may include one or more other components 246. These computer programs that are stored in system memory 222 are executed by a processor (e.g., a Central Processing Unit (CPU)) (not shown). The server computer 220 provides the client computer 200 with access to data in a data store 270.

In alternative embodiments, the computer programs may be implemented as hardware, software, or a combination of hardware and software.

The client computer 200 and server computer 220 may comprise any computing device known in the art, such as a server, mainframe, workstation, personal computer, hand held computer, laptop telephony device, network appliance, etc.

The network 290 may comprise any type of network, such as, for example, a Storage Area Network (SAN), a Local Area Network (LAN), Wide Area Network (WAN), the Internet, an Intranet, etc.

The data store 270 may comprise an array of storage devices, such as Direct Access Storage Devices (DASDs), Just a Bunch of Disks (JBOD), Redundant Array of Independent Disks (RAID), virtualization device, etc.

In conventional systems, keys are evaluated in the order of their presence for the screening predicate. With embodiments, intelligent key skipping and evaluation logic is provided. A certain number of keys qualified by matching predicates are skipped without being fetched and evaluated for screening predicates based on the knowledge that many keys may be false-positive keys and that those keys tend to be consecutive in their presence (i.e., this range of false-positive keys may also be referred to as a "hole" of false-positive keys). Also, keys are stored in sorted order. The matching index column is the primary sorting order, and the index screening column is the secondary sorting order. In cases in which the column value for the matching column is frequently repeated, certain keys may be skipped within each repeating range of index matching columns, as long as potentially qualified keys for the screening predicate is not skipped. This can be ensured by checking that skipping is used within the same index matching column range.

Embodiments provide an enable module 232, a detection module 242, and a skipping module 244.

Figure 3:
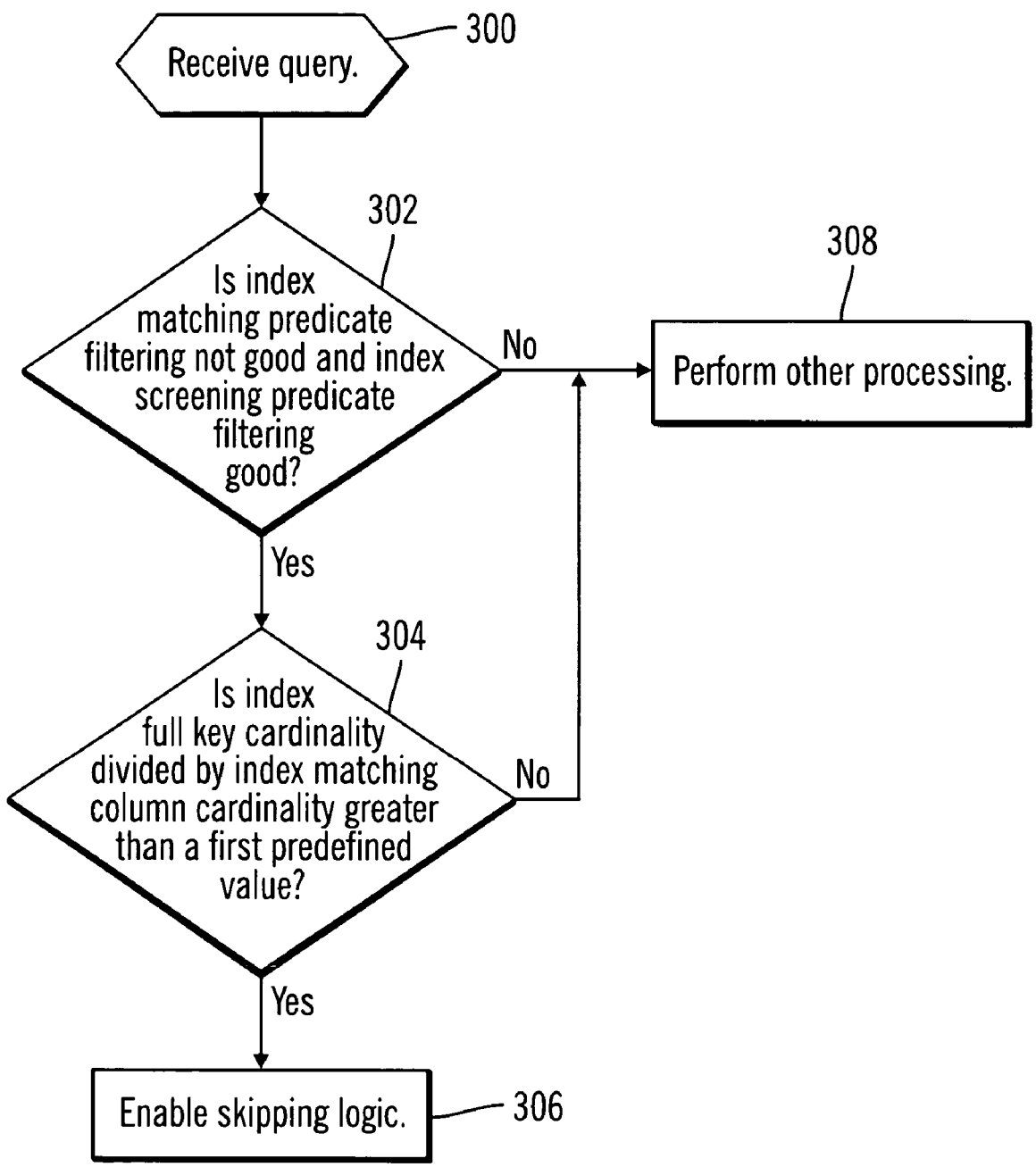
FIG. 3 illustrates logic performed by an enable module in accordance with certain embodiments.

FIG. 3 illustrates logic performed by the enable module 232 in accordance with certain embodiments. Control begins in block 300 with the enable module 232 receiving a query. In block 302, the enable module 232 determines whether the index matching predicate filtering is not good and the index screening predicate filtering is good for the query. If so, then processing continues to block 304, otherwise, processing continues to block 308. That is, the enable module 232 checks for the filtering of the index matching predicates and index screening predicates. Filtering may be described as an estimate of the results that may be obtained by applying a predicate relative to the original number of keys against which the predicate is applied. Filtering is estimated using statistics, rather than by actually applying the predicate. For example, if it is estimated that applying the matching predicate to 100 keys would result in 10 matches, then the filtering is said to be 1/10 (i.e., 10/100). If the filtering for index matching predicates is poor (i.e., a large number of results are estimated, such as 90/100), but the index screening predicate is very selective (i.e., a small number of results are estimated, such as 5/100), the enable module 232 recognizes that there are a lot of holes of false-positive keys that may be skipped.

In block 304, the enable module 232 determines whether an index full key cardinality divided by an index matching column cardinality is greater than a first predefined value (also referred to as a "ratio" predefined value). If so, processing continues to block 306, otherwise, processing continues to block 308. That is, the enable module 232 uses certain statistical information, such as the index full key cardinality and the matching column cardinality. The index full key cardinality may be described as a number of distinct key values for all index columns (e.g., if the index has two columns, and there are key values A, A, B in a first column and A, C, C in a second column, then the index full key cardinality is three). The matching column cardinality may be described as a number of distinct key values for a column associated with a matching predicate. For example, if the first column is a matching column, then the matching column cardinality for the first column would be two. If the ratio of the index full key cardinality to the matching column cardinality is high, then the enable module recognizes that the repeat rate of matching column values is high (i.e., for consecutive keys in the leaf pages, it is likely that many have the same values).

In block 306, the enable module 232 enables skipping logic that is performed by the skipping module 244. In certain embodiments, enabling the skipping logic includes setting a skipping mode indicator to indicate that skipping logic is to be enabled. Then, the detection module 242 checks the skipping mode indicator, and if the skipping mode indicator is set to indicate that skipping is enabled, the detection module 242 performs certain processing, which may include setting a start skipping indicator to indicate that skipping is to be performed. The start skipping indicator is checked by the skipping module 244. Thus, if the conditions of blocks 302 and 304 are met, skipping logic is enabled by the enable module 232. In block 308, other processing is performed.

Figure 4A:
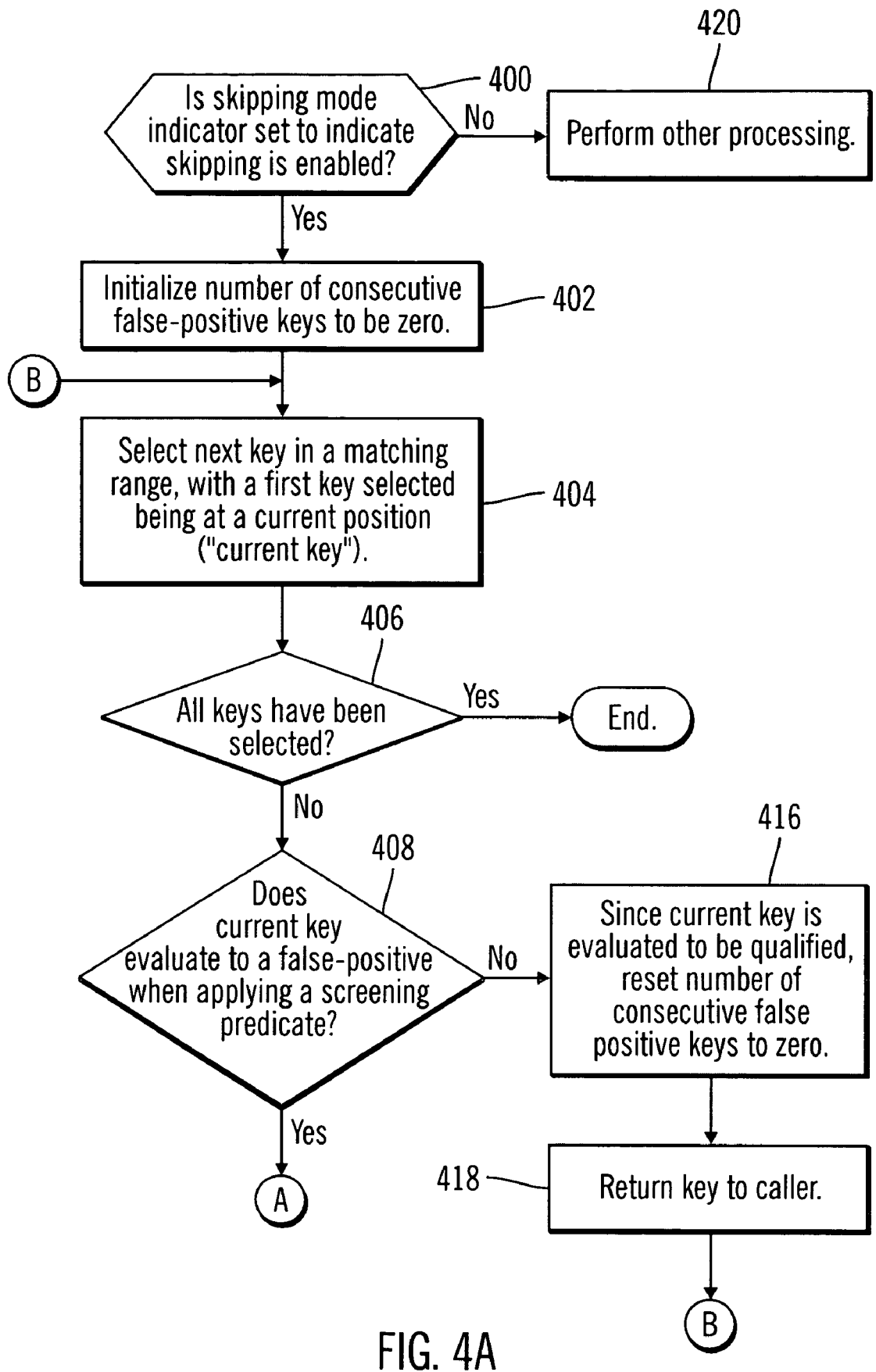
FIGS. 4A and 4B illustrate logic performed by a detection module in accordance with certain embodiments.
Figure 4B:
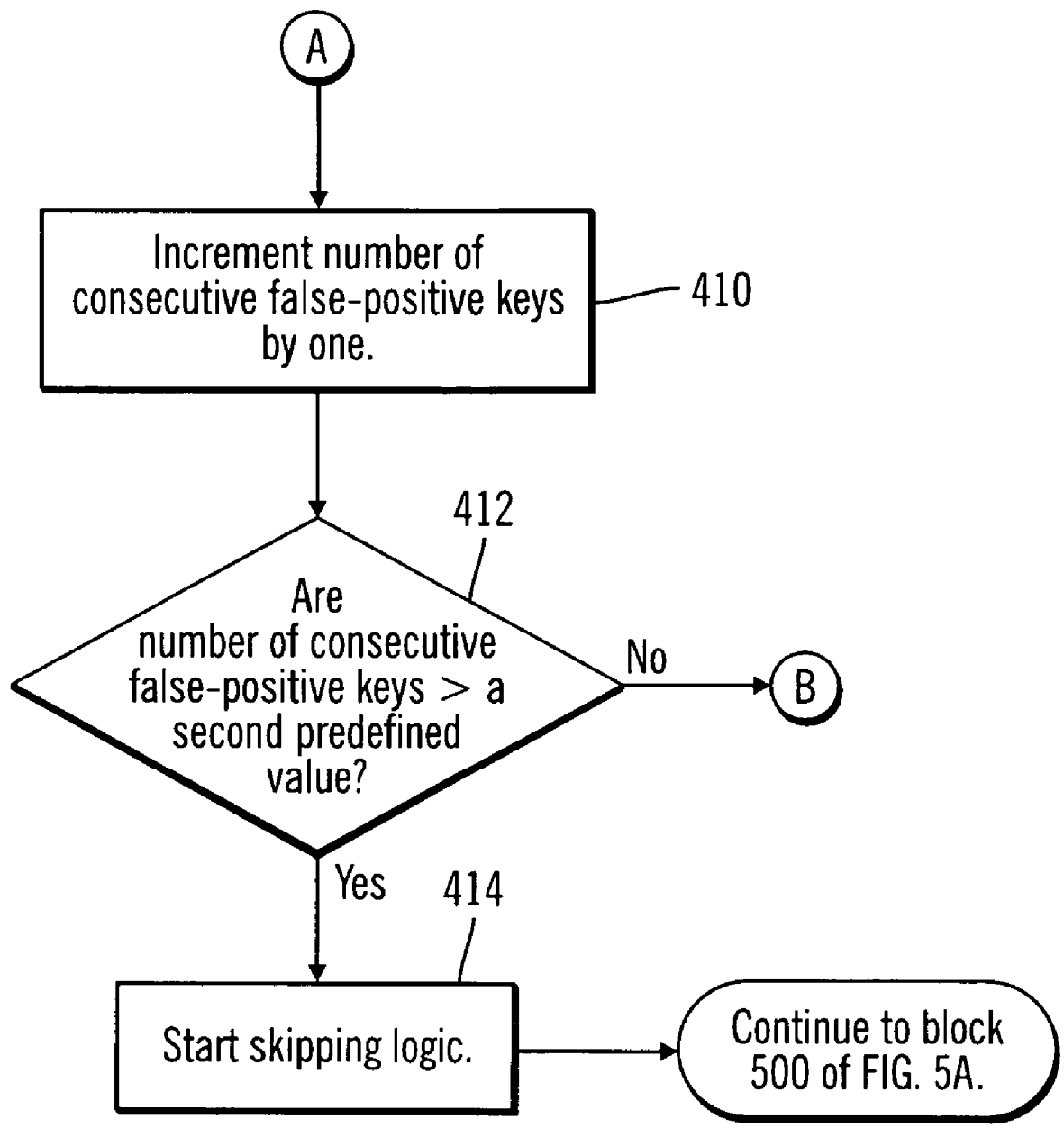

FIGS. 4A and 4B illustrate logic performed by the detection module 242 in accordance with certain embodiments. Control begins in block 400 with the detection module 242 determining whether the skipping mode indicator is set to indicate that skipping is enabled. If so, processing continues to block 402, otherwise, processing continues to block 420 and other processing is performed. In block 402, the detection module 242 initializes a number of consecutive false-positive keys to be zero. In block 404, the detection module 242 selects a next key in a matching range of the matching predicate, with a first key selected being at a current position. The selected key may be referred to as a "current key". In block 406, the detection module 242 determines whether all keys have been selected. If so, processing ends, otherwise, processing continues to block 408.

In block 408, the detection module 242 determines whether the current key evaluates to a false-positive when applying a screening predicate. If so, processing continues to block 410, otherwise, processing continues to block 416. In block 410, the detection module 242 increments the number of consecutive false-positive keys by one. In block 412, the detection module 242 determines whether the number of consecutive false-positive keys is greater than a second predefined value (also referred to as "false-positive" predefined value). If so, processing continues to block 414, otherwise, processing loops back to block 404 of FIG. 4A to select the next key, if there is one. In block 414, the detection module 242 starts the skipping logic and processing continues to block 500 of FIG. 5A. In certain embodiments, the detection module 242 sets a start skipping indicator to indicate that skipping is to be performed. The start skipping indicator is checked by the skipping module 244.

Block 416 is reached when the current key has evaluated to be qualified against the screening predicate, and the detection module 242 resets the number of consecutive false positive keys to be zero. In block 418, the detection module 242 returns the key to a caller, such as the data store manager 230 or another component 234 of the data store manager 230. From block 418, processing loops back to block 404 to select the next key, if there is one.

Thus, the detection module 242 is capable of autonomically detecting whether the current key is within a hole of false-positive keys. If so, the detection module 242 invokes the skipping module 244, otherwise, the next key is fetched and evaluated.

Figure 5A:
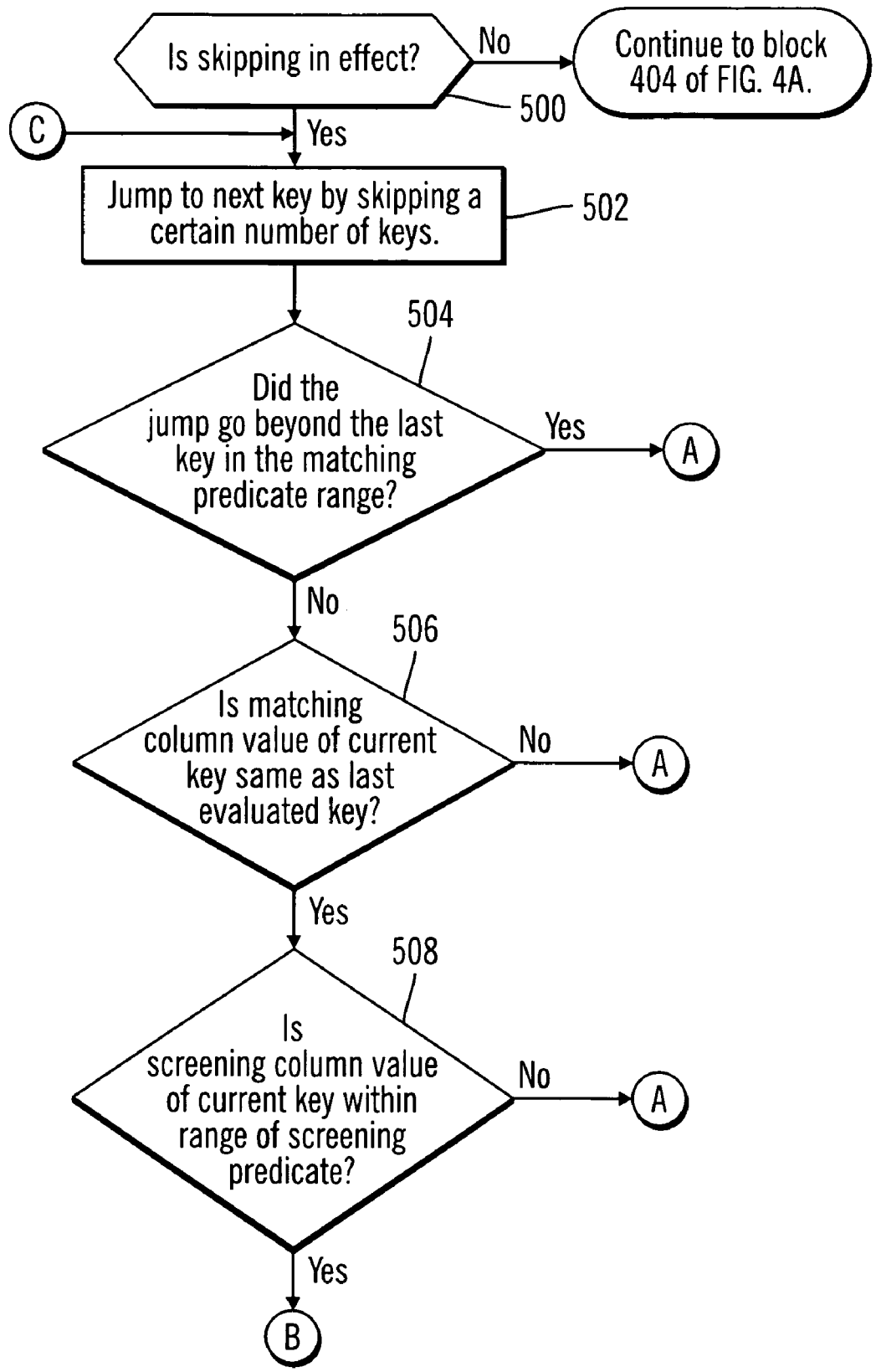
FIGS. 5A, 5B, and 5C illustrate logic performed by a skipping module in accordance with certain embodiments.
Figure 5B:
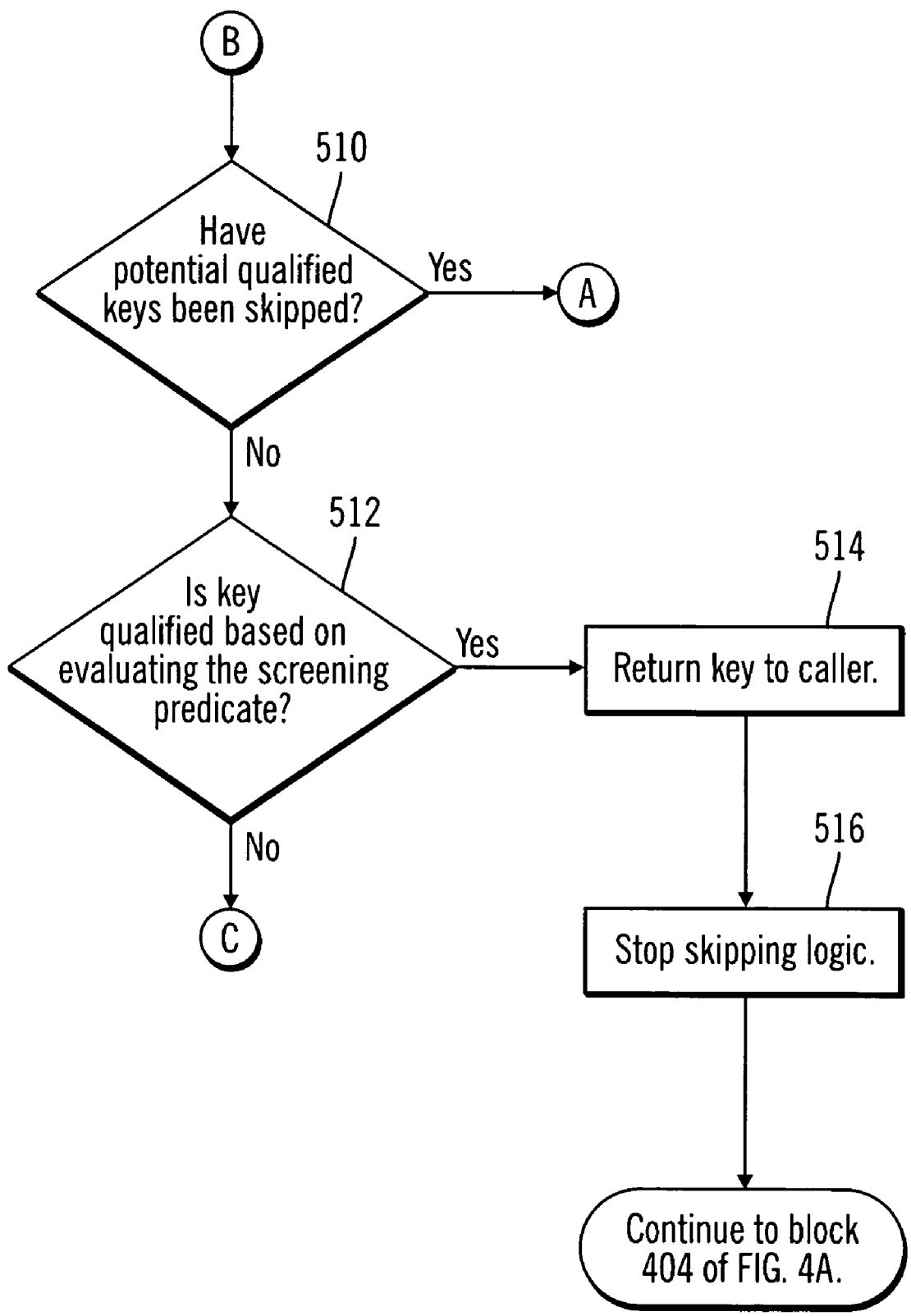
Figure 5C:
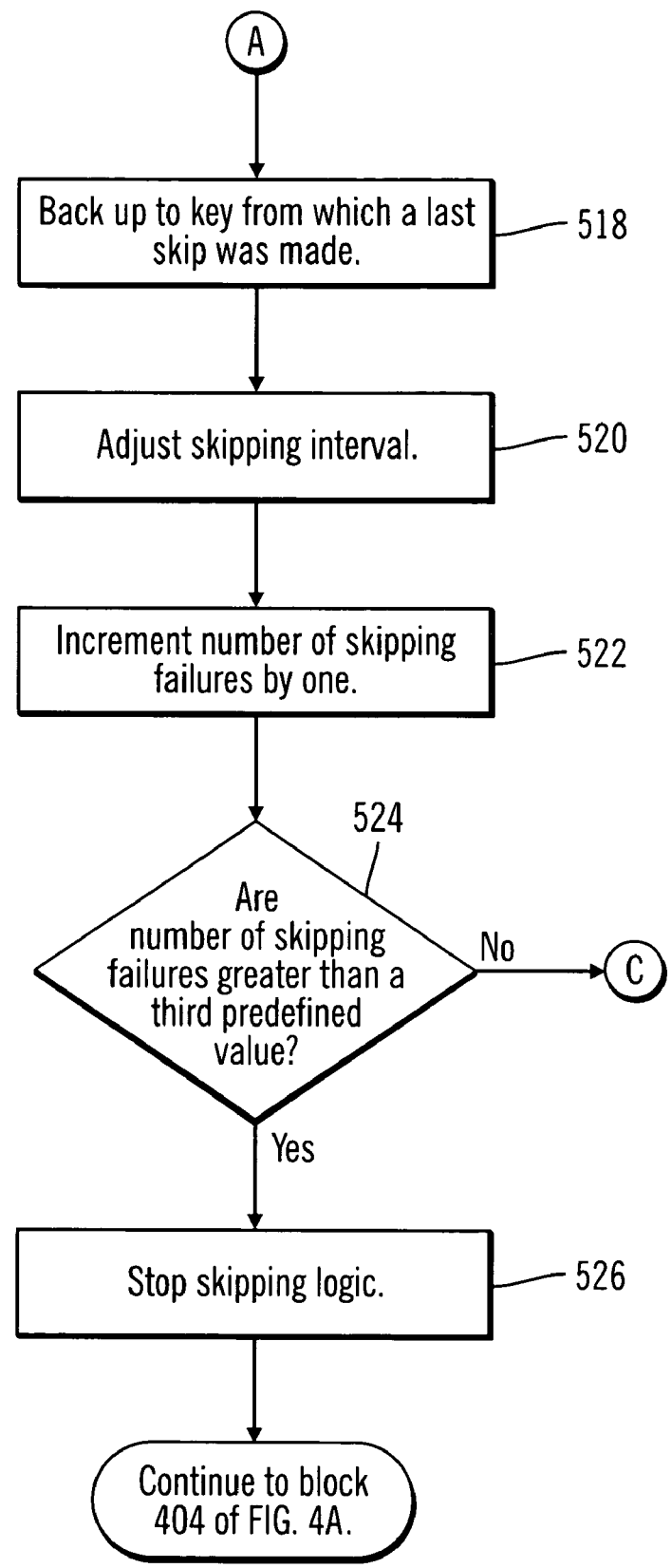

FIGS. 5A, 5B, and 5C illustrate logic performed by the skipping module 244 in accordance with certain embodiments. Control begins at block 500 with the skipping module 244 determining whether skipping is in effect. In certain embodiments, this is done by checking the value of the start skipping indicator. If skipping is in effect, processing continues to block 502, otherwise, processing continues to block 404 of FIG. 4A.

In block 502, the skipping module 244 jumps to the next key by skipping a certain number of keys. In block 504, the skipping module 244 determines whether the jump went beyond the last key in the matching predicate range. If so, processing continues to block 518 of FIG. 5C, otherwise, processing continues to block 506.

In block 506, the skipping module 244 determines whether the matching column value of the current key is the same as a last evaluated key. If they are the same, processing continues to block 508, otherwise, processing continues to block 518 of FIG. 5C. In block 508, the skipping module 244 determines whether the screening column value of the current key is within a range of the screening predicate. If so, processing continues to block 510, otherwise, processing continues to block 518 of FIG. 5C. Thus, if the conditions of blocks 506 or block 508 are true, then processing continues to determine whether the skipping was successful.

In block 510, the skipping module 244 determines whether potential qualified keys have been skipped. If so, processing continues to block 518 of FIG. 5C, otherwise, processing continues to block 512. It can be determined whether potential qualified keys have not been skipped based on the type of the predicate (e.g., an "=" predicate or a "between" predicate), and based on the type of the index (e.g., unique index or nonunique index). For example, with reference to Query (2) (below), if a key has value 300001, then qualified keys have not been skipped, but if the key has the value 300010, it is possible that some qualified keys have been skipped.

In block 512, the skipping module 244 determines whether the key is qualified based on evaluating the screening predicate. If so, processing continues to block 514, otherwise, processing continues to block 502 of FIG. 5A to perform another skip. Thus, if the evaluation of the key right after the skipping shows that the key is inside the hole of false-positive keys and potentially qualified keys have not been skipped, then the skipping module 244 performs another skip.

In block 514, the skipping module 244 returns the key to a caller, such as the data store manager 230 or another component 234 of the data store manager 230. In block 516, the skipping module 244 stops the skipping logic. In certain embodiments, the skipping logic is stopped by setting the start skipping indicator to indicate that skipping is not to be performed. From block 516, processing continues to block 404 of FIG. 4A.

Thus, if the evaluation of the key right after the skipping shows that the key is qualified and no potentially qualified keys have been skipped, the key is returned to the data store manager 230 or another component 234 of the data store manager 230 and the next key is evaluated without any skipping. Then, the skipping module 244 resumes skipping after a predefined number of consecutive keys are evaluated to be false-positive, which the detection module 242 detects.

In block 518 of FIG. 5C, the skipping module 244 backs up to the key from which the last skip was made. In block 520, the skipping module 244 adjusts a skipping interval. In block 522, a number of skipping failures is incremented by one. In block 524, the skipping module 244 determines whether the number of skipping failures is greater than a third predefined value (also referred to as "skipping failures" predefined value). If so, processing continues to block 526, otherwise, processing continues to block 502 of FIG. 5A to perform another skip. In block 526, the skipping module 244 stops the skipping logic. From block 526, processing continues to block 404 of FIG. 4A. Thus, if the evaluation of a key right after the skipping reveals that the current skip interval is too big. In this case, a decreased skip interval is set. Then, the skipping module 244 backs up to the previous key position and attempts another skip with the scaled down skip interval. In certain embodiments, if the second attempt also fails, the keys are evaluated one after another, until the skipping is started again by the detection module 242.

In block 526, the skipping module 244 stops the skipping logic. From block 526, processing continues to block 404 of FIG. 4A.

Thus, the skipping module 244 automatically adjusts the skipping interval based on the results of a last set of evaluations. In certain embodiments, the skipping interval does not result in leaping beyond a current page, unless there is knowledge that the hole of false-positive keys extends beyond the current page. In certain embodiments, an initial skipping interval is determined such that the key that is jumped to is the highest key on a page (i.e., the last key on the page). Since the keys are ordered on the page, it is possible to go to the highest key on the page without fetching other keys in between the current key and the highest key on the same page. To move to a next page, the skipping module 244 uses a next page pointer in a leaf page.

In various embodiments, the first predefined value, the second predefined value, and the third predefined value may be the same or different values.

Merely to enhance understanding of embodiments of the invention, an example will be provided with reference to Query (2). The example is not intended to limit the embodiments in any manner. Query (2) is provided again for easy reference.

| Query (2) |
| --- |
| SELECT * FROM T<br>WHERE date BETWEEN '2003-01-01' AND '2003-06-30'  <-- 50% selectivity<br>    AND amount >= 300000;  <-- 2% selectivity |

Figure 6:
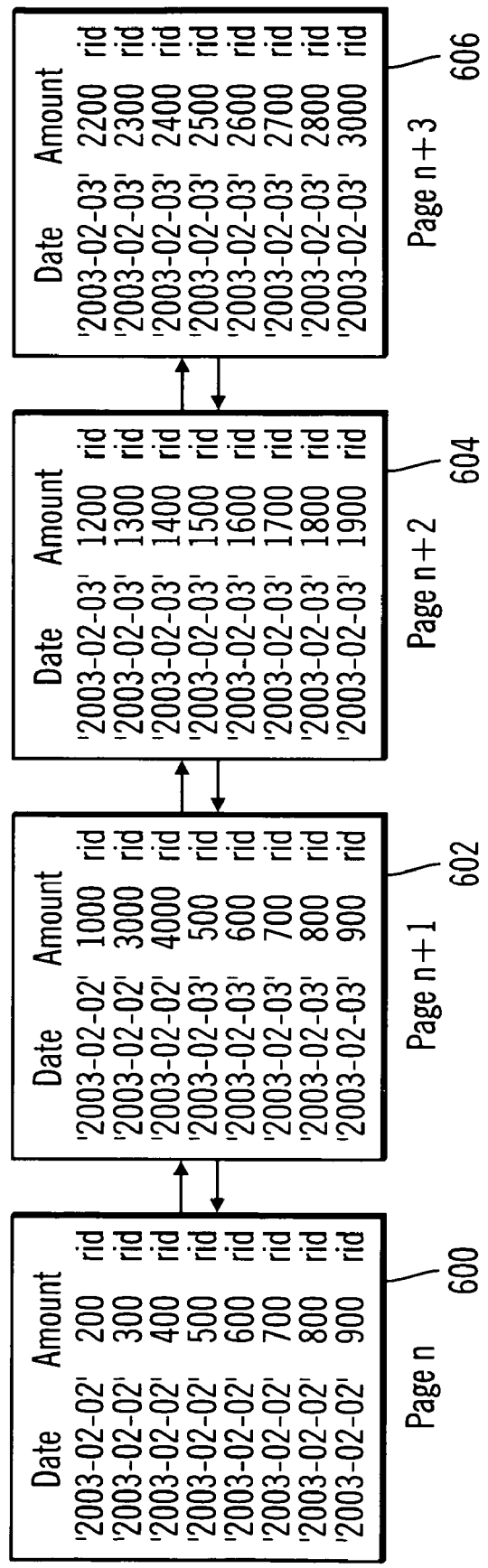
FIG. 6 illustrates leaf pages in a B-tree index in accordance with certain embodiments.

FIG. 6 illustrates leaf pages 600, 602, 604, 606 in a B-tree index in accordance with certain embodiments. Each leaf page 600, 602, 604, 606 of the B-tree index includes a data column for the matching predicate and an amount column for the screening predicate. Each leaf page 600, 602, 604, 606 is sorted based on the date column, as well as on the amount column. For example, a number of keys have a same value for the matching predicate (e.g., 2003-02-02) on leaf page n 600 and leaf page n+1 602. When skipping is used in this example, it is possible to avoid evaluating the screening predicate for many of the keys with common matching predicate values.

Using the traditional query evaluation techniques, for Query (2), 500,000 keys are fetched and evaluated.

In this example, every day, there are 1,000,000/365=2,700 transactions, which implies that there are 2700 consecutive transaction records with the same matching predicate column. In addition for a typical 4K page and key length of 20 bytes, there are on average 200 keys on each page. It takes multiple skips for the matching column to change, and there is a 2% filter factor of the screening predicate.

When the techniques of embodiments of the invention are applied to the evaluation of Query (2), the average skipping interval is equal to the average number of keys per page divided by the number of attempts of skipping. If a second attempt is used after the first one fails, then the average skipping interval is 200/2=100 keys. Among the keys qualified by the matching predicate, if 20% of them fail both attempts of skipping, then the success rate of skipping is 80%. For each failed skip, there may be increased fetch and evaluation costs, so there may be trade-offs when choosing the number of skipping attempts. Moreover, out of 500,000 keys, the number of skips attempted is (500,000*80%/110)*(80%+ 4*20%)=6,400 times, whereas the conventional fetch and evaluation is 500,000*20%=100,000 times. Therefore, the total number of fetch and evaluation processes is 100,000+6, 400=106,400, saving CPU time and system resources used in evaluating screen predicates by nearly 80% compared to the conventional solution.

Another example will be provided to enhance understanding of embodiments of the invention, but the example is not intended to limit the embodiments in any manner. With embodiments, during the index scan, certain keys with common values on a matching column may be skipped, without evaluating the screen predicate(s). Query (2) is provided again for easy reference.

| Query (2) |
| --- |
| SELECT * FROM T<br>WHERE date BETWEEN '2003-01-01' AND '2003-06-30'  <-- 50% selectivity<br>    AND amount >= 300000;  <-- 2% selectivity |

Assuming that index IX1 (which is an index over the date and amount columns of table T) is nearly unique, the average number of keys per 'date' is approximately 2740 (i.e., 1000000/365). Therefore, for each key scanned within the matching range (i.e., the first half of the B-tree), the index manager 240 is able to skip most of the 2740 keys in the leaf pages by following the key map and/or the next page pointer of the leaf pages. The key map may be described as a map that indicates where keys are located on leaf pages.

Pseudocode A provides example pseudocode that the index manager 240 may use for skipping keys with common values on a matching column.

Pseudocode A
(1) Initialize variables.
  (A) Set EK, where EK is an expected number of keys that have common values on a matching column. For example, an initial value of EK for the example of Query (2) is 2470). In certain embodiments, the value of EK may be bounded by the number of keys on one index page. The value of EK is used as a maximum skipping interval.
  (B) Set SKIP=FALSE, where SKIP is the start skipping indicator.
  (C) Set N=0, where N is a number of consecutive false-positive keys.
  (D) Set M=EK, where M is a skipping interval.
  (E) Set K=0, where K is a number of skipping failures.
(2) Select a next key in a range defined by a matching predicate, starting from a first key. Processing is terminated if there are no keys left to be selected since (e.g., processing is already at the last key in the range).
(3) Evaluate selected key using screening predicates.
  (A) If the evaluation succeeds, return key to caller and go to (2) to select next key.
  (B) Else the evaluation failed, so increment the number of consecutive false-positive keys by one (N=N+1).
    (I) If N is greater than a predefined number, start the skipping logic by setting SKIP=TRUE. Initialize the skipping interval to a maximum value by setting M=EK. Reset number of consecutive false-positive keys to be zero (N=0) and reset number of skipping failure to be zero (K=0).
(4) If SKIP=TRUE, then start the skipping logic.
  (A) Skip M keys.
  (B) Select the key after skipping.
  (C) Check if the key is outside the range of the matching predicate, if the matching column part of the key has been changed from the last key selected, if the screening column value of the key is outside of the range of the screening predicate or if potential qualified keys have been skipped. If any of the conditions are true, then the skipping skipped too many keys.
    (I) Restore the position before skipping.
    (II) Divide skipping interval by 2 (M=M/2).
    (III) Increment number of skipping failure by one (K=K+1).
    (IV) If K>predefined number, then SKIP=FALSE, go to (2) to select the very next key, else go to (4) to perform another skip with a smaller skipping interval.
  (D) If skipping is not too much, then check if current key qualifies the screening predicate.
    (I) If yes, then return key to caller and reset M=EK, N=0, K=0, and SKIP=false. Go to (2) to select next key without skipping.
    (II) If no, then go to (4) to do another skip.

Embodiments utilize the nature of a B-tree index in which keys are in sorted order and pages are in sorted order, with pointers pointing to a next page, to achieve performance enhancement. Embodiments, may significantly reduce the CPU cost of evaluating index screening predicates without introducing much overhead. Embodiments autonomically determine when to start and stop the skipping logic and adjust the skipping interval in order to obtain optimal performance.

In certain embodiments, the Central Processing Unit (CPU) time for certain index scans may be reduced.

Embodiments provide a technique for evaluating index screening predicates, which results in the reduction of CPU time when processing queries that include index screening predicates.

Embodiments enable skipping of many false-positive keys, without evaluating screening predicates. Significant reduction of CPU time is expected for index scans with the following characteristics: poor matching selectivity (e.g. 50% in the above query); good screening selectivity (e.g. 2% in the above query); and/or low column cardinality on matching columns compared to full index cardinality (e.g. roughly 180 days comparing with 1 million rows in the table in the above example described with respect to Query (2)).

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Certain embodiments may be directed to a method for deploying computing infrastructure by a person or automated processing integrating computer-readable code into a computing system, wherein the code in combination with the computing system is enabled to perform the operations of the described embodiments.

The term logic may include, by way of example, software or hardware and/or combinations of software and hardware.

The logic of FIGS. 3, 4A, 4B, 5A, 5B, and 5C describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3, 4A, 4B, 5A, 5B, and 5C may be implemented in software, hardware, programmable and non-programmable gate array logic or in some combination of hardware, software, or gate array logic.

Figure 7:
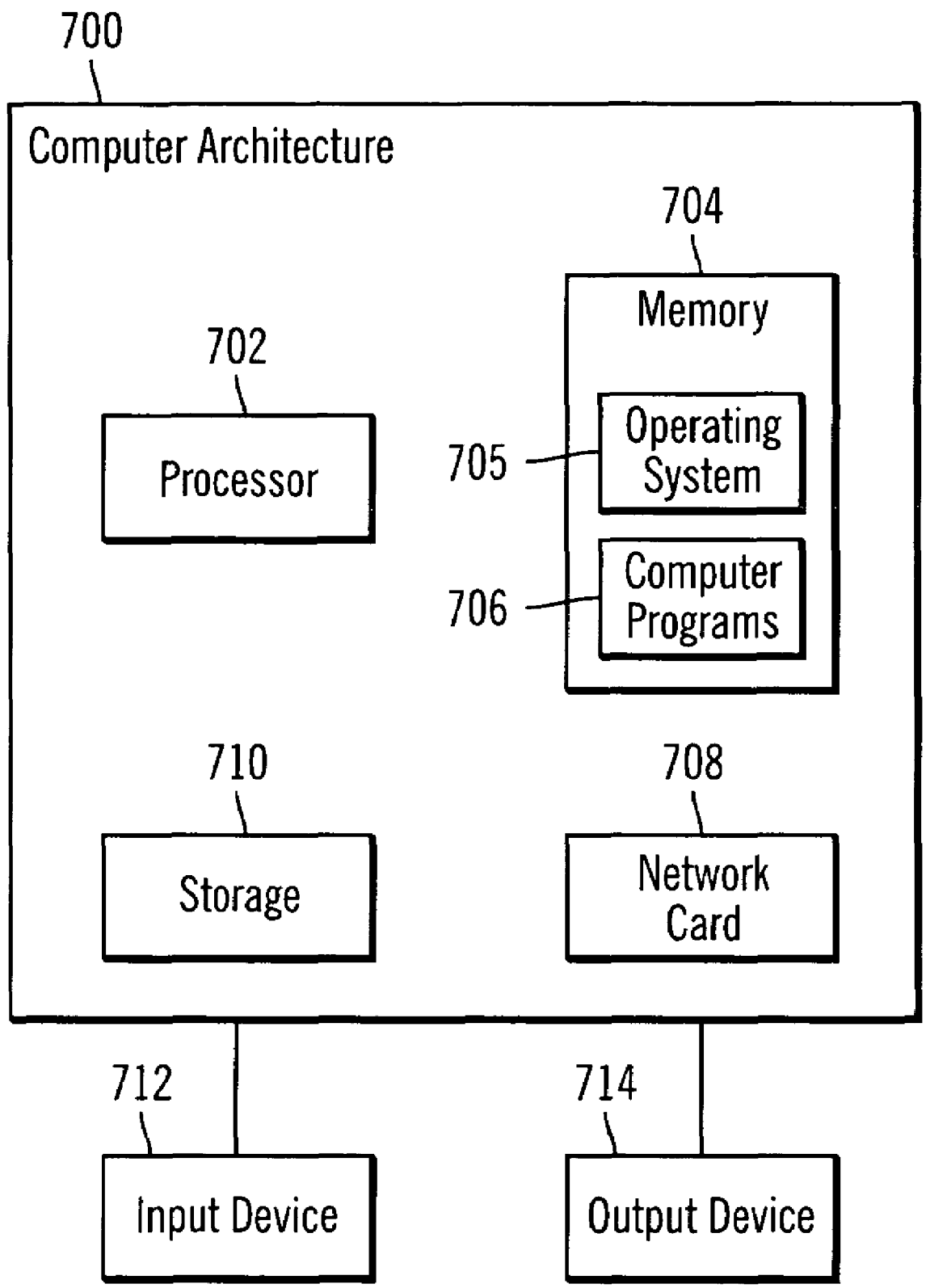
FIG. 7 illustrates an architecture of a computer system that may be used in accordance with certain embodiments.

FIG. 7 illustrates an architecture 700 of a computer system that may be used in accordance with certain embodiments. Client computer 100, server computer 120, and/or operator console 180 may implement architecture 700. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of embodiments has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the invention, the embodiments reside in the claims hereinafter appended or any subsequently-filed claims, and their equivalents.

What is claimed is:

1. A method for processing a query using an index, comprising:
  determining that index matching predicate filtering is not good and that index screening predicate filtering is good for the query, wherein the filtering uses statistics to provide an estimate of results that may be obtained by applying a predicate relative to an original number of keys against which the predicate is applied;
  determining that an index full key cardinality divided by an index matching column cardinality is greater than a ratio predefined value, wherein the index full key cardinality is a number of distinct key values for index columns, and wherein the matching column cardinality is a number of distinct key values for a column associated with the matching predicate; and setting a skipping mode indicator to indicate that skipping is enabled;

determining whether a number of consecutive keys that evaluate to a false-positive when applying a screening predicate in the query exceeds a false-positive predefined value, wherein, for a key in a range defined by a matching predicate, the number of consecutive keys that evaluate to a false-positive is incremented when the key does not match the screening predicate, wherein the matching predicate has a constraint on a leading index column, and wherein the screening predicate filters the keys in the range defined by the matching predicate;

starting skipping of one or more keys in the index based on a skip interval in response to determining that the number of consecutive keys exceeds the false-positive predefined value, wherein the skipping allows a number of keys qualified by the matching predicate in the query to be skipped without being fetched and evaluated for the screening predicate; and in response to determining that evaluation of a key right after the skipping based on the skip interval reveals that the skip interval is too big, backing up to a key from which the skipping was performed;

adjusting the skip interval;

incrementing a number of skipping failures by one;

determining whether a number of skipping failures is greater than a skipping failures predefined threshold;

in response to determining that the number of skipping failures is greater than a skipping failures predefined threshold, stopping the skipping; and in response to determining that the number of consecutive keys exceeds the false-positive predefined value, restarting the skipping of the one or more keys; and in response to determining that the number of skipping failures is not greater than a skipping failures predefined threshold, skipping one or more keys in the index based on the adjusted skip interval.

2. The method of claim 1, further comprising:
determining whether a key in the index evaluates to a false-positive when applying the screening predicate in the query to the key;
incrementing the number of consecutive keys that evaluate to a false-positive in response to determining that the key in the index does evaluate to a false-positive; and
returning the key to a caller in response to determining that the key in the index does not evaluate to a false-positive.

3. The method of claim 1, further comprising:
processing a next key in response to determining that the number of consecutive keys does not exceed the false-positive predefined value.

4. The method of claim 1, further comprising:
stopping the skipping in response to determining that the selected key that is in the range defined by the matching predicate is evaluated to be qualified against the screening predicate in the query.

5. The method of claim 1, wherein the skipping skips to a key and further comprising:
determining at least one of: (1) the skipping went beyond a last key in a matching predicate range, (2) a matching column value of the key is not the same as a matching column value of a last evaluated key, (3) a screening column value of the key is not within a range of a screening predicate in the query, or (4) potential qualified keys have been skipped.

6. The method of claim 5, further comprising:
in response to adjusting the skip interval, incrementing a number of skipping failures.

7. The method of claim 1, further comprising:
determining that the skipping did not go beyond a last key in a matching predicate range, a matching column value of the key is the same as a matching column value of a last evaluated key, that a screening column value of the key is within a range of a screening predicate in the query, and that potential qualified keys have not been skipped.

8. The method of claim 7, further comprising:
returning the key to a data store manager.

* * * * *